(12) United States Patent
Ito

(10) Patent No.: US 7,565,072 B2
(45) Date of Patent: Jul. 21, 2009

(54) CAMERA, CONTROL METHOD THEREFOR, PROGRAM, AND STORAGE MEDIUM

(75) Inventor: Kenji Ito, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 470 days.

(21) Appl. No.: 11/340,182

(22) Filed: Jan. 25, 2006

(65) Prior Publication Data

US 2006/0165403 A1 Jul. 27, 2006

(30) Foreign Application Priority Data

Jan. 25, 2005 (JP) ............................. 2005-017191

(51) Int. Cl.
G03B 3/10 (2006.01)
G03B 13/00 (2006.01)
(52) U.S. Cl. ..................... 396/121; 396/123; 348/345
(58) Field of Classification Search ................... 396/89, 396/103, 104, 125–128, 121, 123; 348/345–357
See application file for complete search history.

(56) References Cited

U.S. PATENT DOCUMENTS

| 5,597,999 | A | 1/1997 | Kinba et al. |
| 5,675,140 | A * | 10/1997 | Kim .......................... 250/201.2 |
| 6,308,015 | B1 | 10/2001 | Matsumoto |
| 7,058,294 | B2 | 6/2006 | Nakahara |
| 2004/0057712 | A1 * | 3/2004 | Sato et al. ...................... 396/89 |
| 2004/0170419 | A1 | 9/2004 | Taka |
| 2004/0202461 | A1 | 10/2004 | Nakahara |
| 2005/0168621 | A1 * | 8/2005 | Kageyama et al. .......... 348/349 |
| 2005/0185086 | A1 * | 8/2005 | Onozawa .................... 348/349 |

FOREIGN PATENT DOCUMENTS

| JP | 7-43605 | 2/1995 |
| JP | 9-181954 | 7/1997 |
| JP | 2001-133679 | 5/2001 |
| JP | 2001-275033 | 10/2001 |
| JP | 2001-281530 | 10/2001 |
| JP | 2004-309866 | 11/2004 |
| JP | 2006-017933 | 1/2006 |

* cited by examiner

Primary Examiner—W. B. Perkey
Assistant Examiner—Minh Q Phan
(74) Attorney, Agent, or Firm—Canon USA., Inc., IP Division

(57) ABSTRACT

This invention can increase the focusing speed and quickly focus a camera to an object regardless of the position of the object within the field of the viewfinder. When the position of a main object falls within a range in which phase difference AF is impossible, the lens scan range of contrast AF is determined by referring to distance measurement information of phase difference AF near the main object or immediately preceding distance measurement information of phase difference AF. The scan range of contrast AF is narrowed to increase the focusing speed.

8 Claims, 15 Drawing Sheets

Background Art

CAMERA, CONTROL METHOD THEREFOR, PROGRAM, AND STORAGE MEDIUM

FIELD OF THE INVENTION

The present invention relates to a focus control technique for a camera.

BACKGROUND OF THE INVENTION

Recently, so-called electronic cameras have prevailed. In the electronic camera, an object image is formed on a semiconductor image sensing device, e.g., an image sensor via a photographing optical system. The object image is converted into an electrical signal, and image data of the obtained still image is recorded on a recording medium such as a semiconductor memory or magnetic disk.

Most electronic cameras of this type have an auto focus (AF) mechanism of controlling photographing conditions in order to automatically focus on an object image. The AF mechanism often adopts a method called contrast AF or hill-climbing AF. This is because the AF method can use an output from an image sensing device directly for AF. More specifically, in contrast AF, the contrast value (AF evaluation value) of a value output from an image sensing device is evaluated, and the electronic camera is determined to be focused at the maximum contrast value.

To the contrary, silver halide single lens reflex cameras widely employ a technique called phase difference AF in addition to contrast AF in order to achieve auto focus. Phase difference AF is advantageous in making the in-focus point coincide with the film surface by one driving because how far the in-focus point is apart from the film surface can be instantly recognized on the basis of the distance between images (phase difference) when light from the object image is received by a phase difference detection sensor having a CCD line sensor. These two AF methods are widely used in silver halide cameras.

Japanese Patent Laid-Open No. 07-043605 discloses a camera which comprises a focus detection means that detects the focus by phase difference AF and is made up of an optical system and light-receiving sensor, and a focus detection means that detects the focus by contrast AF and is made up of an optical system and light-receiving sensor. This camera uses a combination of focus detection of phase difference AF and focus detection of contrast AF, obtains a defocus amount, and focuses the lens. With this structure, the lens is focused by performing coarse adjustment by focus detection of phase difference AF and fine adjustment by focus detection of contrast AF.

Japanese Patent Laid-Open No. 09-181954 discloses a technique of moving the focus lens by the second focus control means using the position of a focus lens moved by the first focus control, detecting the maximum value of the contrast, and returning the focus lens to the position exhibiting the maximum value.

Japanese Patent Laid-Open No. 2001-281530 discloses a technique of driving the photographing lens on the basis of a phase difference detection signal, and then driving the image sensing lens at a predetermined evaluation value corresponding to the contrast of an object image from a sensed image.

For example, contrast AF focus detection has a small detectable defocus amount, and it is difficult to detect the focus when the camera is greatly out of focus. A long time is taken to scan the focus lens from infinity to the minimum object distance in order to obtain an in-focus point. Contrast AF focus detection is not suitable for a system which requires quick operation or photographing an object which moves quickly. Further, since the high-frequency component less changes at a portion apart from the in-focus point, it is difficult to know whether defocusing arises from a near-focus state or far-focus state.

Phase difference AF focus detection has a large detectable defocus amount, but a dead zone is generated in the focus detection area. Since the moving amount of the AF lens is determined in accordance with a shift of the imaging position of the image sensing device, the AF enable range (AF range) is limited depending on the image sensing device or lens system. For a large range from infinity to the minimum object distance, if the lens system is so set as to enable AF in the entire photographable range, the resolution and AF precision may decrease in terms of the balance with the device size of the image sensing device.

To solve these problems, in Japanese Patent Laid-Open No. 07-043605, the lens is focused by always performing coarse adjustment in a given distance measurement area by phase difference AF focus detection and fine adjustment by contrast AF focus detection.

In Japanese Patent Laid-Open No. 09-181954, the lens is moved to an in-focus point by the first phase difference AF, and scanned before and after the lens position by contrast AF to detect an in-focus point. The lens is scanned after it is returned to a contrast AF start position from a position at which the lens was focused once by phase difference AF. This generates a time loss.

In Japanese Patent Laid-Open No. 2001-281530, the lens of a single lens reflex type digital still camera is driven on the basis of a phase difference detection signal by phase difference AF, and then the lens is driven on the basis of an evaluation value by contrast AF. The result of the phase difference detection signal is not particularly reflected in the contrast AF lens driving control method. A long time is taken to focus the lens. Furthermore, no concrete driving sequence of contrast AF lens driving is mentioned.

According to the prior arts, the camera is focused using the two distance measurement methods in the same distance measurement area. Both phase difference AF and contrast AF are used in one distance measurement area to increase the focusing precision and focusing speed.

As described above, phase difference AF generates a dead zone in the distance measurement area, i.e., an area where the focus cannot be adjusted. In general, the area where the focus cannot be adjusted by phase difference AF can be often covered by contrast AF. In this case, focusing operation is done by only contrast AF focus adjustment. The range in which the focus can be adjusted by only contrast AF becomes relatively wide. If contrast AF is always executed in this area, a long time is-taken for focusing, and a chance to take a picture may be missed.

SUMMARY OF THE INVENTION

The present invention has been made to overcome the conventional drawbacks, and has as its object to increase the focusing speed and quickly focus a camera to an object regardless of the position of the object within the field of the viewfinder.

In order to solve the above problems and achieve the above object, according to the first aspect of the present invention, a camera comprising a first focus detection device which obtains a defocus amount from a phase difference of an object image and detects a focus on the basis of the defocus amount, a second focus detection device which detects the focus in accordance with a magnitude of a high-frequency component in an output image signal that is obtained from an image sensor while a photographing optical system is moved, a first area in a photographing field of view where the focus can be detected by both the first focus detection device and the second focus detection device, and a second area in the photographing field of view where the focus can be detected by the second focus detection device and cannot be detected by the first focus detection device, wherein when a main object to be focused exists in the second area, focus detection by the second focus detection device is controlled by moving the photographing optical system from a position based on a detection result by the first focus detection device.

According to the second aspect of the present invention, a method of controlling a camera having a first focus detection device which obtains a defocus amount from a phase difference of an object image and detects a focus on the basis of the defocus amount, a second focus detection device which detects the focus in accordance with a magnitude of a high-frequency component in an output image signal that is obtained from an image sensor while a photographing optical system is moved, a first area in a photographing field of view where the focus can be detected by both the first focus detection device and the second focus detection device, and a second area in the photographing field of view where the focus can be detected by the second focus detection device and cannot be detected by the first focus detection device, comprising when a main object to be focused exists in the second area, detecting a defocus amount by the first focus detection device, and controlling focus detection by the second focus detection device by moving the photographing optical system from a position based on a defocus amount detection result by the first focus detection device.

According to the third aspect of the present invention, a program is characterized by causing a computer to execute the control method.

According to the fourth aspect of the present invention, a storage medium is characterized by computer-readably storing the program.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Preferred embodiments of the present invention will be described in detail below with reference to the accompanying drawings.

First Embodiment

Figure 1:
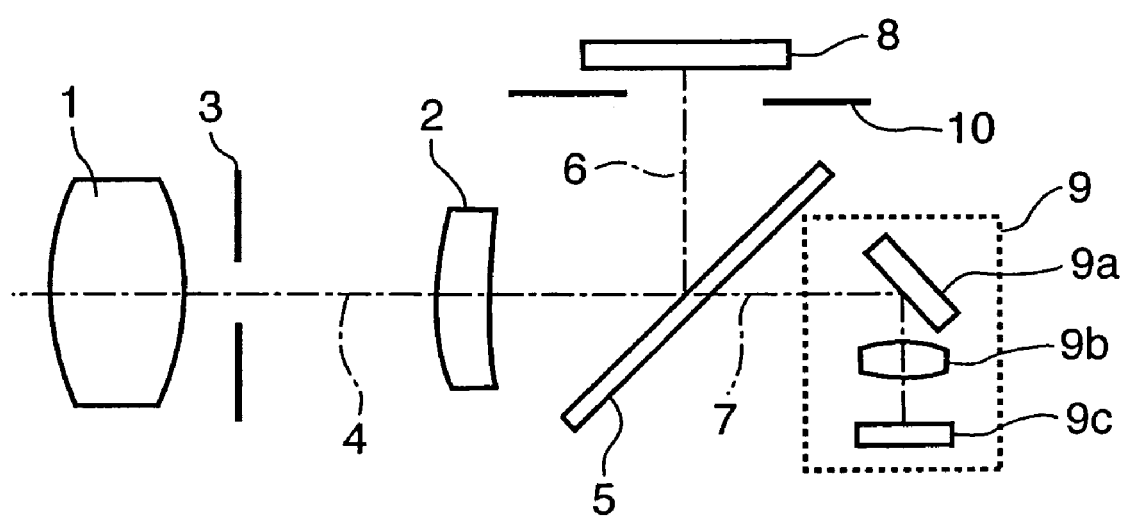
FIG. 1 is a view showing the configuration of an electronic camera according to the first embodiment of the present invention.

FIG. 1 is a view showing the configuration of an electronic camera according to the first embodiment of the present invention.

In FIG. 1, reference numerals 1 and 2 denote photographing lenses for photographing an object. Especially, the photographing lens 2 is a focus lens which is driven in focusing (focus adjustment). Reference numeral 3 denotes a stop which adjusts the light quantity of an object in accordance with the brightness of the object. Reference numeral 4 denotes a photographing optical axis of the photographing lens 1 and focus lens 2. Reference numeral 5 denotes an optical path splitting device which splits a light beam having passed through the photographing lens 1 and focus lens 2 into a photographing light beam and a light beam toward an AF (Auto Focus) system. The optical path splitting device 5 is a half-mirror according to the first embodiment. Reference numerals 6 and 7 denote a photographing optical axis and AF optical axis, respectively, serving as the optical axes of light beams split by the half-mirror 5. Reference numeral 8 denotes an image sensing device which senses an object image with a photographing light beam; and 10, a shutter which temporally regulates a light quantity on the image sensing device 8. When data is read out from the image sensing device 8, the shutter 10 is closed. The shutter 10 is a mechanical shutter. Reference numeral 9 denotes a known phase difference type distance measurement device (phase difference AF device) serving as the first focus detection device which measures the distance to an object upon reception of light having passed through the half-mirror 5. Reference numeral 9a denotes an AF mirror which changes the direction of the AF optical axis and is a total reflection mirror according to the first embodiment. Reference numeral 9b denotes a separator lens which separates a pupil for an AF light beam; and 9c, an AF sensor which performs phase difference type distance measurement (phase difference AF).

Figure 5:
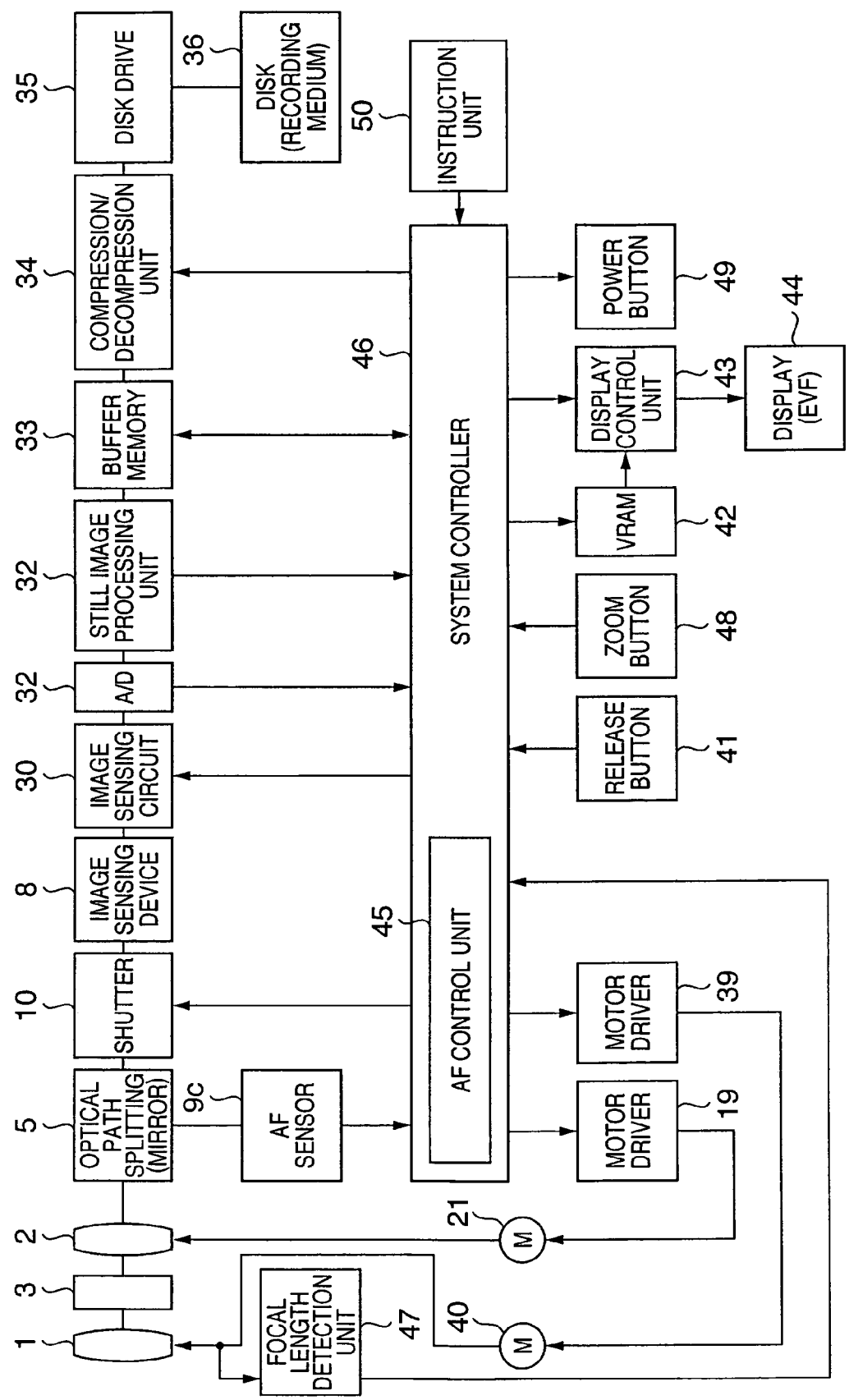
FIG. 5 is a block diagram showing the configuration of the electronic camera according to the first embodiment of the present invention.

FIG. 5 is a block diagram showing the configuration of the electronic camera according to the first embodiment.

In FIG. 5, reference numerals 1 to 10 denote the same parts as those in FIG. 1.

One of light beams split by the half-mirror 5 enters the image sensing device 8. An output from the image sensing device 8 is temporarily stored in a buffer memory 33 via an image sensing circuit 30, A/D converter 31, and still image processing unit 32. When an image is to be saved, the image is JPEG-compressed by a compression/decompression unit 34, and saved in a disk (recording medium) 36 by a disk drive 35. Instead of using the disk drive 35 and disk 36, a detachable recording medium such as a compact flash® card or SD card is also available.

An output from the recording medium 36 is decompressed, stored in the buffer memory 33, and displayed on a display (e.g., EVF: Electronic View Finder) 44 by a display control unit 43 via a VRAM (Video RAM) 42. An output from the AF sensor 9c is input to a system controller 46, and used for AF control of phase difference AF by an AF control unit 45. The AF control unit 45 in the system controller 46 also performs AF control of contrast AF on the basis of an output from the image sensing device 8.

The system controller 46 controls respective units in the camera, and accepts ON/OFF operation of a power button 49 and inputs from a release button 41 and zoom button 48. The release button 41 has a two-switch structure with a switch SW1 for starting photographing preparations of the electronic camera and a switch SW2 for starting photographing. The zoom button 48 is an operation switch for switching the focal length of the electronic camera. The focus lens 2 is controlled by the AF control unit 45 via a motor driver 19 and focus motor 21 on the basis of the results of phase difference AF and contrast AF. The photographing lens 1 associated with switching of the focal length is controlled by the system controller 46 via a motor driver 39 and motor 40 in accordance with the operation of the zoom button 48. At this time, the position of the photographing lens 1 is sent from a focal length detection unit 47 to the system controller 46, and thus the focal length of the photographing lens is always detected. Reference numeral 50 denotes an instruction unit which allows the photographer to instruct the camera on the position of a main object.

Figure 2A:
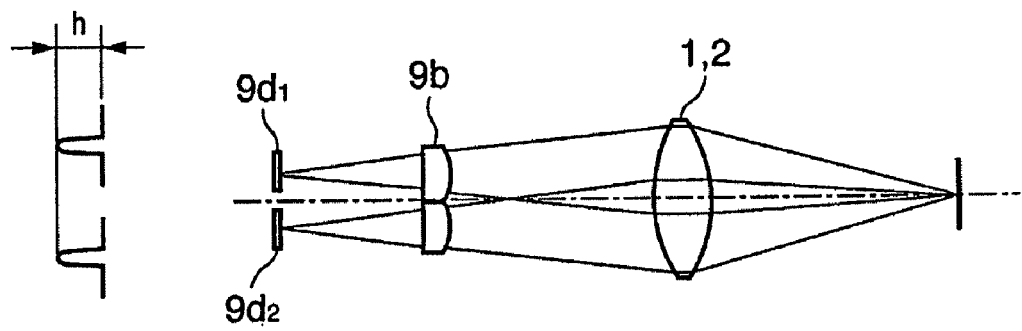
FIGS. 2A to 2C are views for explaining the principle of conventionally known phase difference AF focus adjustment.
Figure 2B:
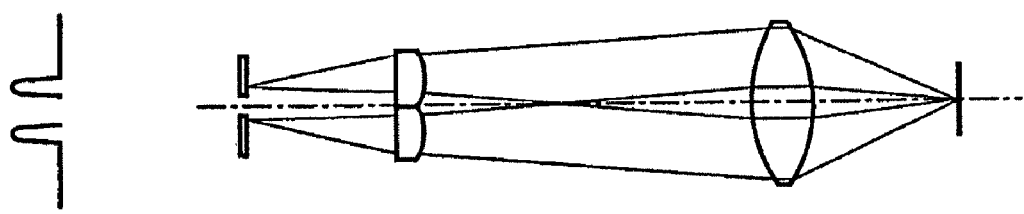
Figure 2C:
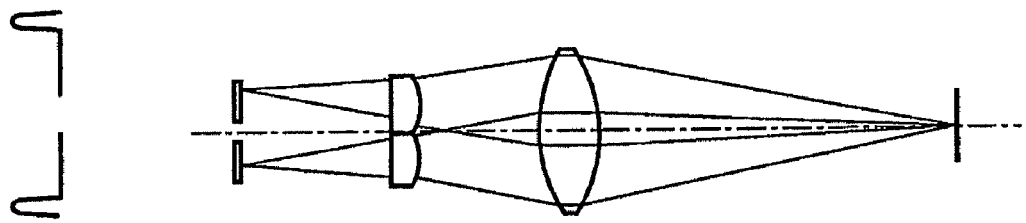

FIGS. 2A to 2C are views for explaining the principle of conventionally known phase difference AF focus adjustment.

In FIGS. 2A to 2C, the separator lens 9b condenses a light beam traveling from the photographing lens 1 to photoelectric conversion element arrays 9d1 and 9d2. FIG. 2A shows a lens position and sensor output in the in-focus state. The positions of the optical system and photoelectric conversion element arrays are adjusted so that images are formed at centers on the photoelectric conversion element arrays 9d1 and 9d2 in the in-focus state. When the photographing lens 1 moves to a near- or far-focus state, as shown in FIG. 2B or 2C, the imaging positions on the photoelectric conversion element arrays 9d1 and 9d2 also move in opposite directions, and move to the two ends of the photoelectric conversion element arrays. The shift amount and shift direction of the imaging position at this time are detected, calculated, and fed back to the focus motor to execute phase difference AF focusing operation.

Figure 3:
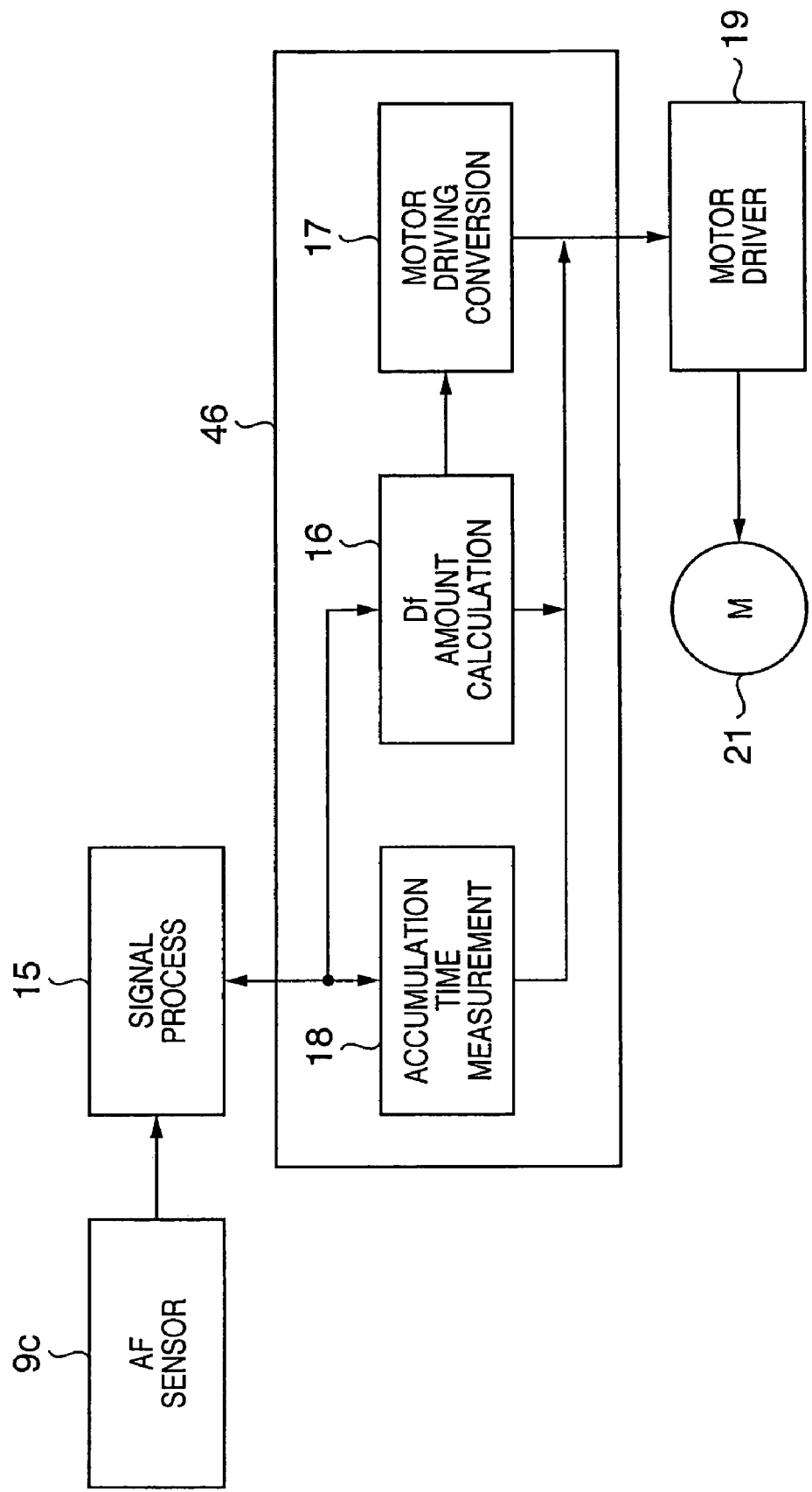
FIG. 3 is a block diagram showing the operation and configuration of phase difference AF according to the first embodiment of the present invention.

FIG. 3 is a block diagram showing the operation and configuration of phase difference AF according to the first embodiment.

The AF sensor 9c having the photoelectric conversion element arrays 9d1 and 9d2 (see FIGS. 2A to 2C) accumulates charges until an output reaches a predetermined value or the elapsed time reaches a predetermined time (Tmax) or less determined by a microcomputer 20. After the end of accumulation, charges are quantized by a signal processing circuit 15, and input to the system controller 46. The quantized information is used to calculate a shift amount, which is normalized as a defocus amount Df. The normalized defocus amount Df is converted by a motor driving amount conversion unit 17. The focus motor 21 is driven by a necessary amount corresponding to the converted value, and guides the focus lens 2 to an in-focus point. Once the focus lens 2 is focused, the in-focus state is maintained unless the object moves. In other words, detecting whether the in-focus state is maintained is to always detect how the in-focus state changes at a predetermined time interval. Accordingly, whether the object moves can be detected.

Figure 4A:
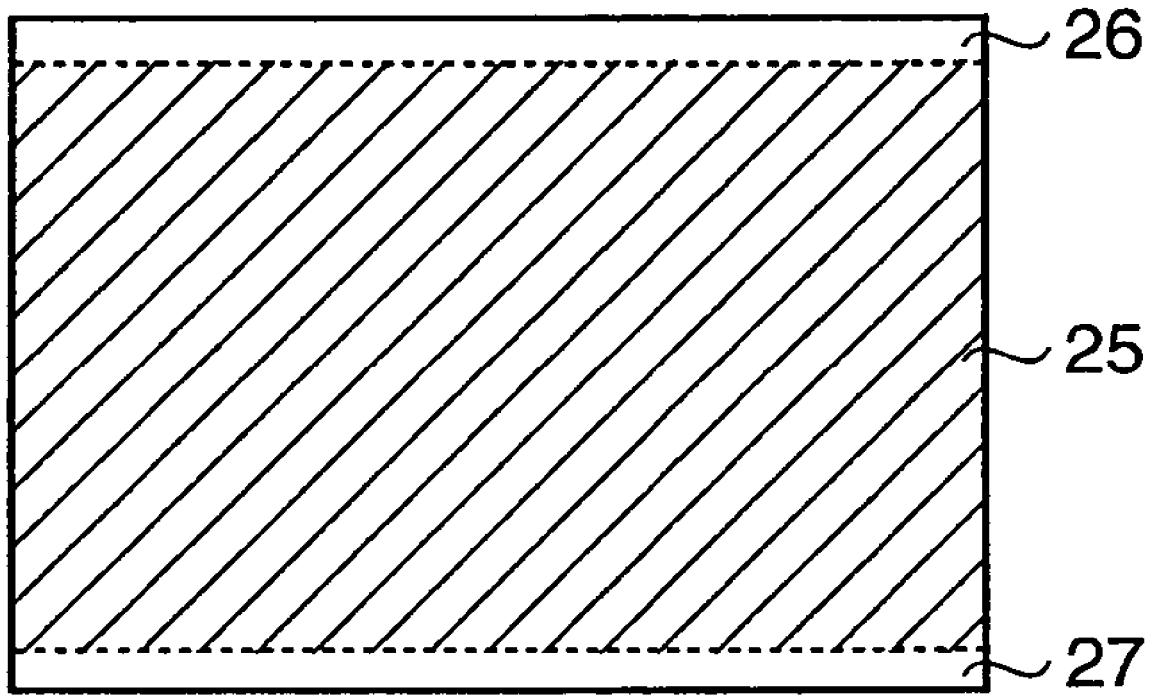
FIG. 4A is a schematic view showing the photographing area of an image sensing device.

FIG. 4A is a schematic view showing the photographing area of the image sensing device.

The first embodiment executes discharge transfer in which data is read out from only a necessary read area at a normal speed, and data is read out from the remaining area at a high speed for the purpose of high-speed read. Reference numeral 25 denotes a normal-read transfer area; and 26 and 27, former and latter high-speed-read transfer areas. By discharging charges at a high speed from an area except a necessary read area, the speed of partial read can be increased.

Figure 4B:
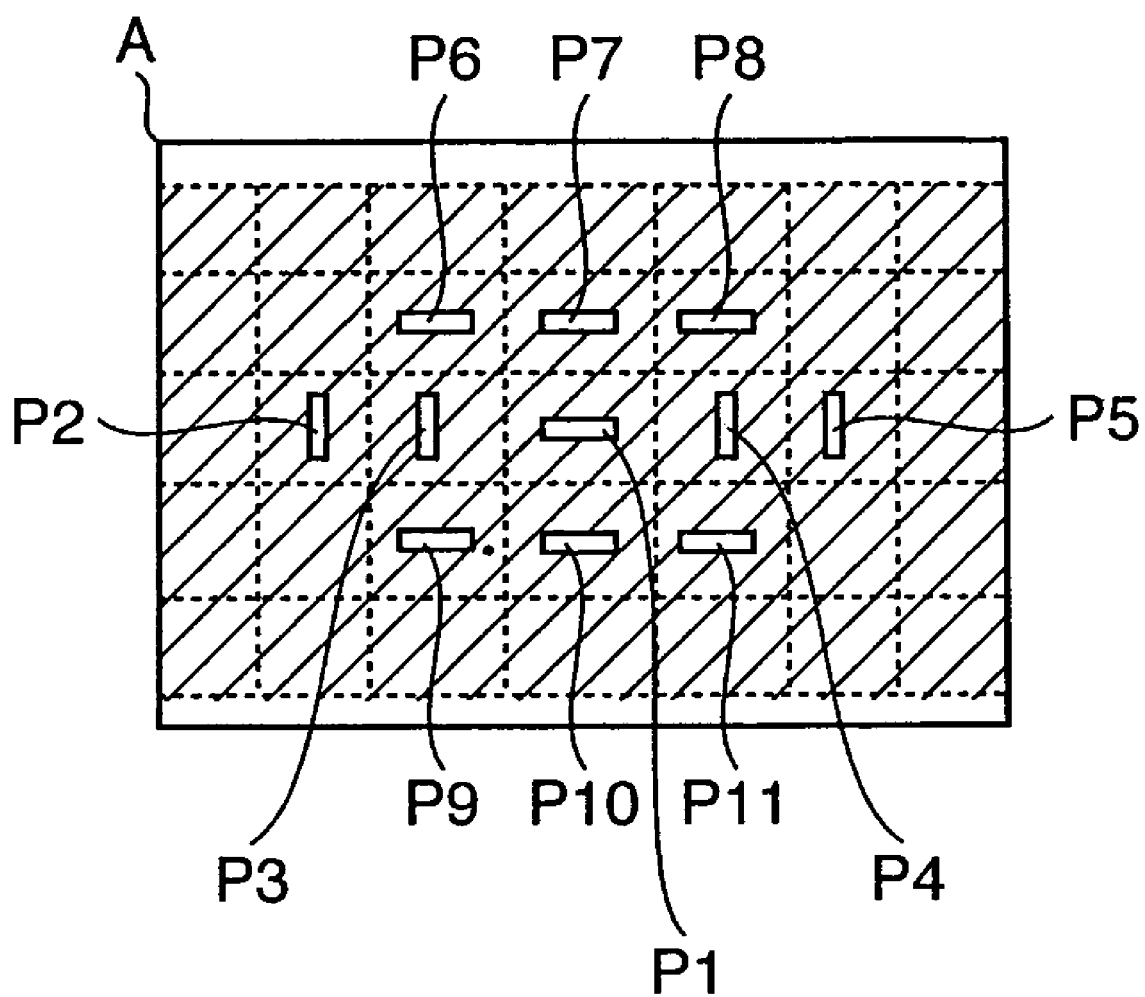
FIG. 4B is a view showing the photographing area and the distance measurement area of phase difference AF.
Figure 4C:
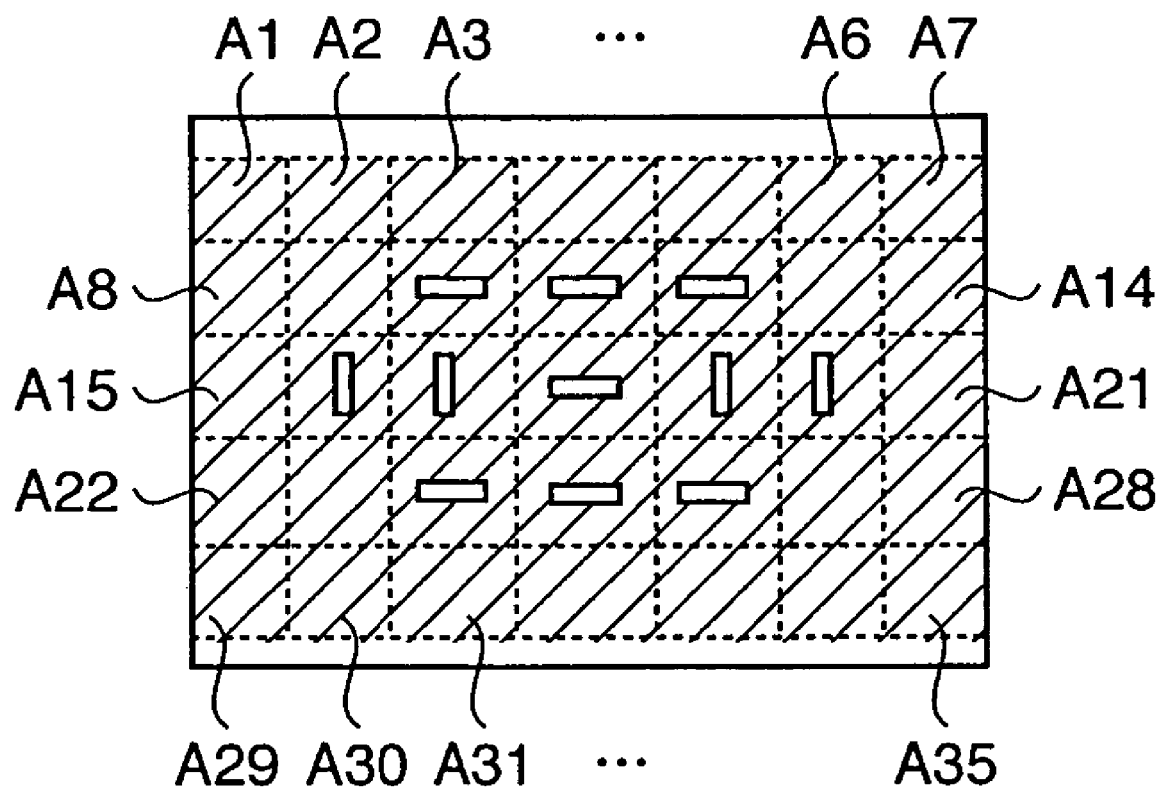
FIG. 4C is a view showing the photographing area and the distance measurement area of contrast AF.

FIGS. 4B and 4C are views showing the relationship between the photographing area, the distance measurement area of phase difference AF, and the distance measurement area of contrast AF.

FIG. 4B shows the positions of phase difference AF enable points P1 to P11 in a photographing area A. As shown in FIG. 4B, phase difference AF has a limited distance measurable area in the photographing area. When a main object on which the lens is to be focused does not exist at the positions of the phase difference AF points P1 to P11, the lens cannot be focused on the main object by phase difference AF.

FIG. 4C shows the positions of contrast AF enable areas A1 to A35 in the photographing area A. As shown in FIG. 4C, the distance can be measured by contrast AF in almost all the areas in the photographing area. Since contrast AF covers both an area where phase difference AF is possible and an area where it is impossible, the lens can be focused on a main object regardless of its position.

Figure 6:
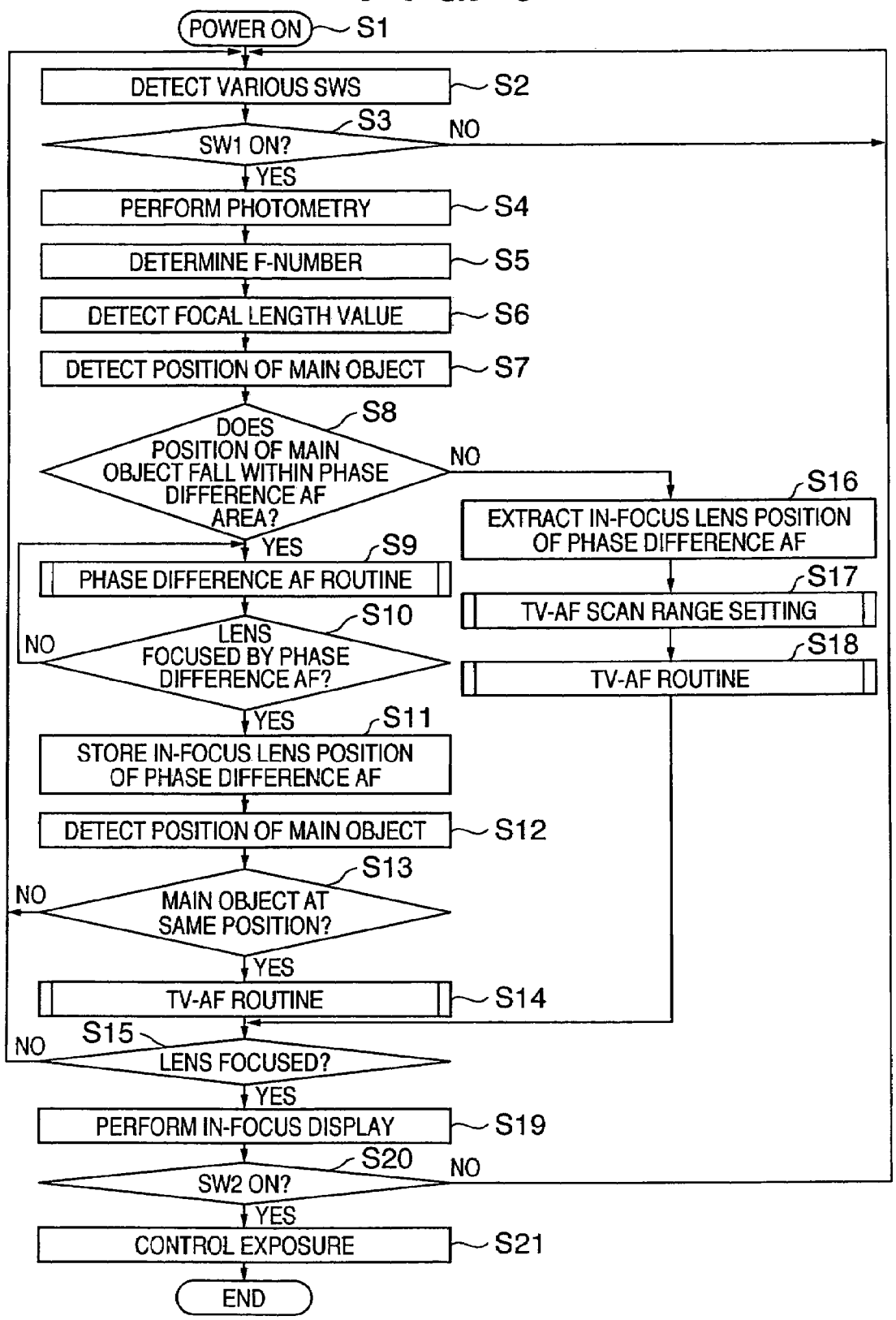
FIG. 6 is a main flowchart showing the operation of the electronic camera according to the first embodiment of the present invention.

FIG. 6 is a main flowchart showing the operation of the electronic camera according to the first embodiment.

When the power button 49 is turned on (step S1), various SWs are detected (step S2). The release switch 41 has two switches. When the photographer presses the release switch 41, the first switch SW1 is turned on first, and various preparations for photographing are made. Then, the photographer further presses the release switch 41, SW2 below SW1 is turned on, and photographing operation starts.

It is detected whether SW1 of the release switch 41 is ON (step S3). If SW1 is OFF, the flow returns to step S2. If SW1 is ON, the image sensing device 8 performs photometry (step S4). An F-number for adjusting the stop is determined in accordance with the photometry value (step S5), and the stop 3 of the photographing lenses 1 and 2 is controlled.

The focal length is detected by the focal length detection unit 47 of the photographing lenses 1 and 2 (step S6). The position of a main object in the photographing frame is detected (step S7). To recognize the position of the main object, the distance may always be measured at each distance measurement point of phase difference AF, and an object position at a near distance may always be recognized and determined as the position of the main object. The recognized shape and motion are detected from an output from the image sensing device, the shape of an object and a change in its position in the frame are predicted from the pieces of information, and the shape and position of the focus detection area are determined in accordance with the prediction result. This method has already been known, and a detailed description thereof will be omitted.

It is determined whether the main object falls within the phase difference AF area (step S8). If the main object falls within the phase difference AF area, the flow advances to a phase difference AF routine (step S9). The phase difference AF routine will be described with reference to FIG. 7.

It is determined whether the lens has been focused by phase difference AF (step S10). If the lens has not been focused, the flow returns to the phase difference AF routine (step S9). If it is determined by phase difference AF focus determination that the lens has been focused (step S10), the in-focus lens stop position when the lens has been focused by phase difference AF is stored (step S11).

The position of the main object is detected again (step S12), and it is determined whether the main object is at the same position as that in step S8 (step S13). If the main object exists at the same position, the flow advances to a TV-AF (contrast AF) routine (step S14). If the TV-AF result represents that the lens is not focused, the flow returns to step S2 to execute the subsequent flow again (NO in step S15).

If the main object does not fall within the phase difference AF area as a result of determining whether the main object falls within the phase difference AF area (step S8), the immediately preceding in-focus lens position of phase difference AF is extracted (step S16). If no phase difference AF is done immediately before the current one, an initial value is extracted. The in-focus lens position of phase difference AF is extracted, and the flow advances to a scan range setting routine (step S17) of setting the TV-AF scan range in accordance with contrast information from the phase difference AF, and the F-numbers and focal length values of the photographing lenses 1 and 2. The scan range setting routine will be described with reference to FIG. 8. The flow advances to a TV-AF routine on the basis of the TV-AF lens scan range (step S18), and TV-AF is performed.

If the in-focus point of the focus lens 2 can be specified as a result of TV-AF, in-focus display is performed (step S19).

If SW2 of the release switch 41 is OFF, the flow returns to step S2 to execute the subsequent flow again (NO in step S20). If SW2 is ON (YES in step S20), exposure control (actual photographing) is done (step S21), and the process ends.

Figure 7:
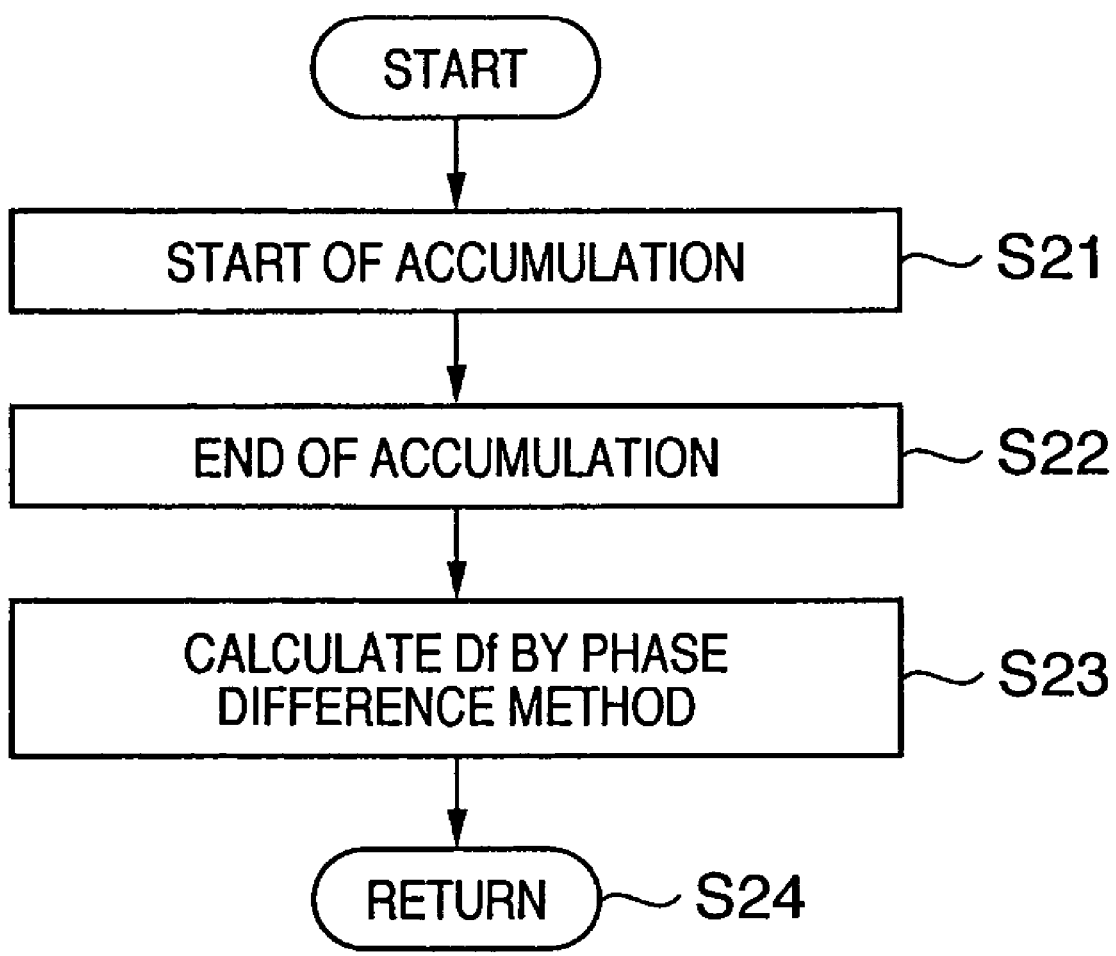
FIG. 7 is a flowchart showing a phase difference AF routine.

FIG. 7 is a flowchart showing the phase difference AF routine according to the first embodiment.

In FIG. 7, when distance measurement operation starts, charge accumulation by the AF sensor 9c starts (step S21). After a predetermined amount of charges is accumulated (step S22), the defocus amount (Df) by the phase difference method is calculated (step S23). The driving position of the focus lens 2 is calculated in accordance with the calculation result (step S8).

Figure 8:
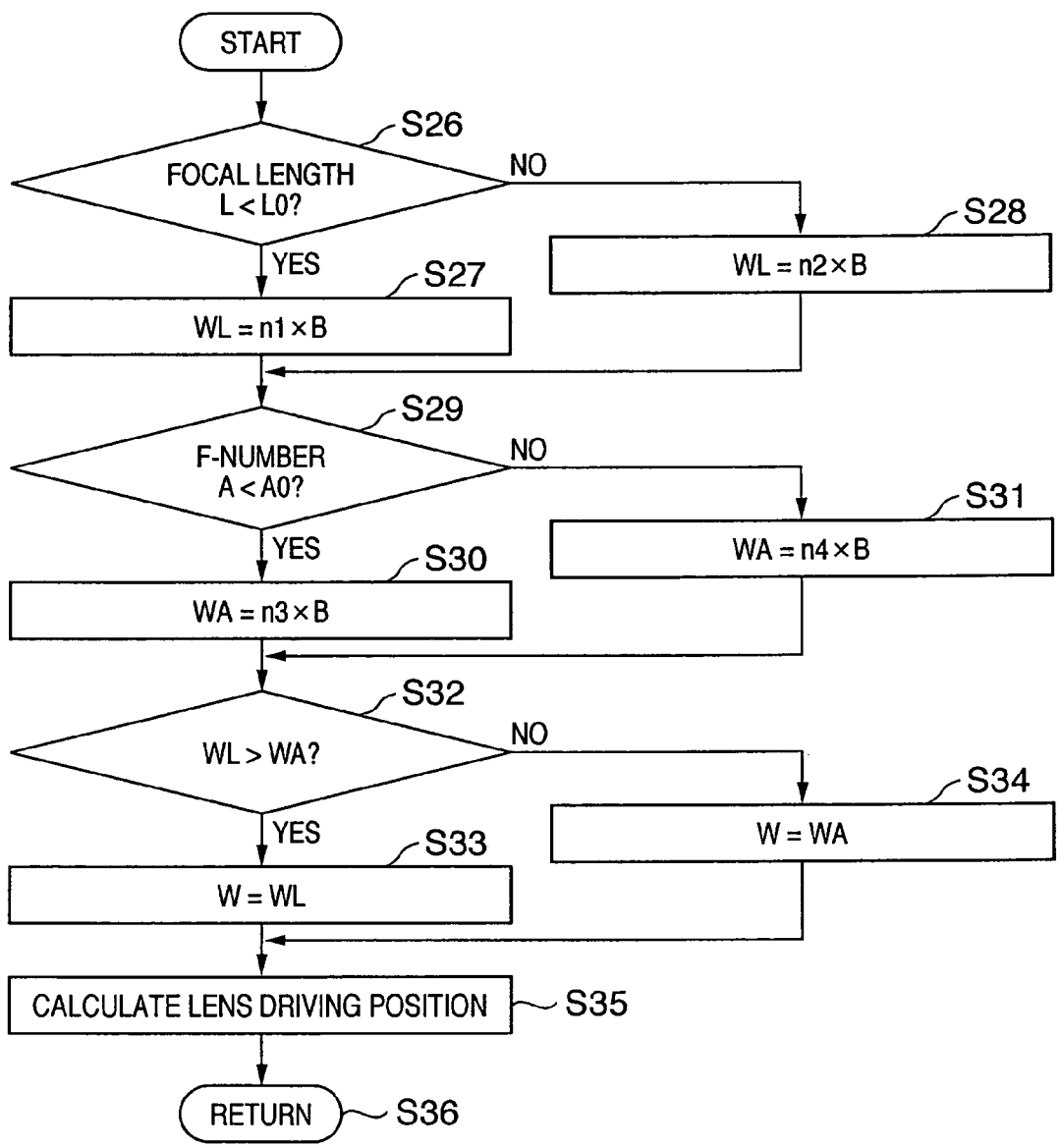
FIG. 8 is a flowchart showing a scan range setting routine.

FIG. 8 is a flowchart showing the scan range setting routine according to the first embodiment.

In the scan range setting routine, an F-number A and focal length value L are received in steps S5 and S6 of FIG. 6, respectively. B represents the moving interval of the focus lens 2 in order to receive data for TV-AF (contrast AF).

After the start of the scan range setting routine, if the focal length value L is smaller than a predetermined value L0 (YES in step S26), a TV-AF scan range WL which is calculated from the focal length value is set to n1 multiples of the moving interval B (step S27). If the focal length value L is equal to or larger than the predetermined value L0 (NO in step S26), the TV-AF scan range WL which is calculated from the focal length value is set to n2 multiples of the moving interval B (step S28). At this time, n1 and n2 are different values, and n1>n2. As the focal length becomes longer, the depth of field becomes shallower. Even if the scan range for detecting a focus by TV-AF is narrow, the in-focus point can be detected.

If the F-number A is smaller than a predetermined value A0 (YES in step S29), a TV-AF scan range WA which is calculated from the F-number is set to n3 multiples of the moving interval B (step S30). If the F-number A is equal to or larger than the predetermined value A0 (NO in step S29), the TV-AF scan range WA which is calculated from the F-number A is set to n4 multiples of the moving interval B (step S31). At this time, n3 and n4 are different values, and n3<n4. As the F-number A becomes smaller, the depth of field becomes shallower. Even if the scan range for detecting a focus by TV-AF is narrow, the in-focus point can be detected.

The scan range WL obtained from the focal length value L and the scan range WA obtained from the F-number A are compared. If WL>WA (YES in step S32), a final TV-AF scan range W is set to the wider scan range WL (step S33). If WL≦WA as a result of comparison between the scan ranges WL and WA (NO in step S32), the final TV-AF scan range W is set to the wider scan range WA (step S34). An absolute position to which the focus lens 2 is to be moved is calculated from the scan range W (step S35), and the flow returns to the main flowchart (step S36).

Figure 9:
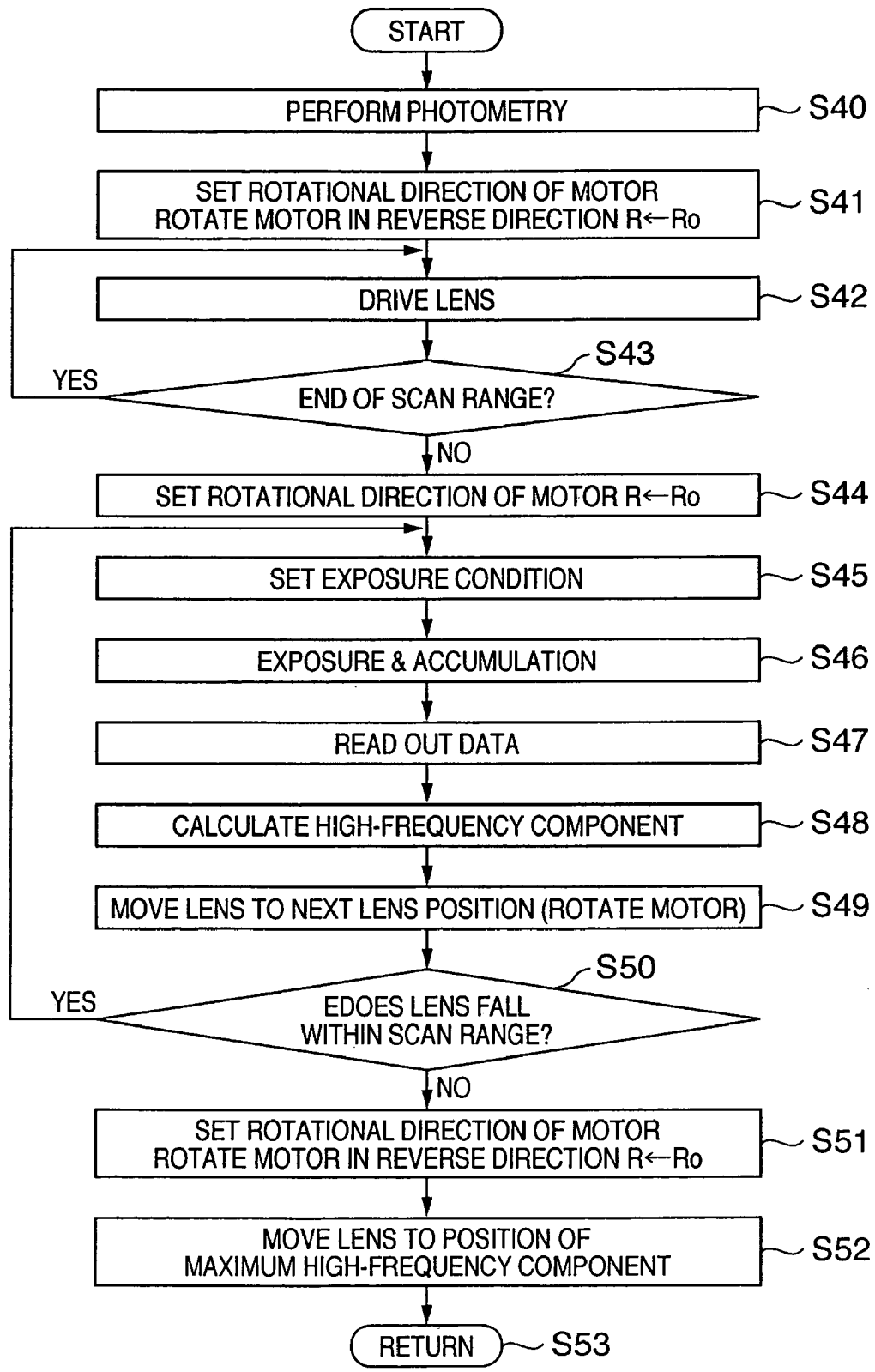
FIG. 9 is a flowchart showing a TV-AF routine.

FIG. 9 is a flowchart showing the TV-AF routine.

When the TV-AF routine starts, photometry is performed for exposure preparations and TV-AF (step S40). A rotational direction R of motor driving is set. The reverse direction to a direction Ro in which the focus lens 2 has been driven by the above-mentioned phase difference AF (step S41) is set as the rotational direction R of the focus motor 21. The focus lens 2 is driven in this rotational direction of the focus motor 21. The focus motor 21 is rotated in the reverse direction, and the TV-AF scan range is set using, as a center, an in-focus lens position detected by the phase difference AF routine. An end point from which TV-AF scan starts is calculated from the in-focus lens position and TV-AF scan range, and the focus lens 2 is moved to this point. This operation will be explained with reference to FIG. 10.

Figure 10:
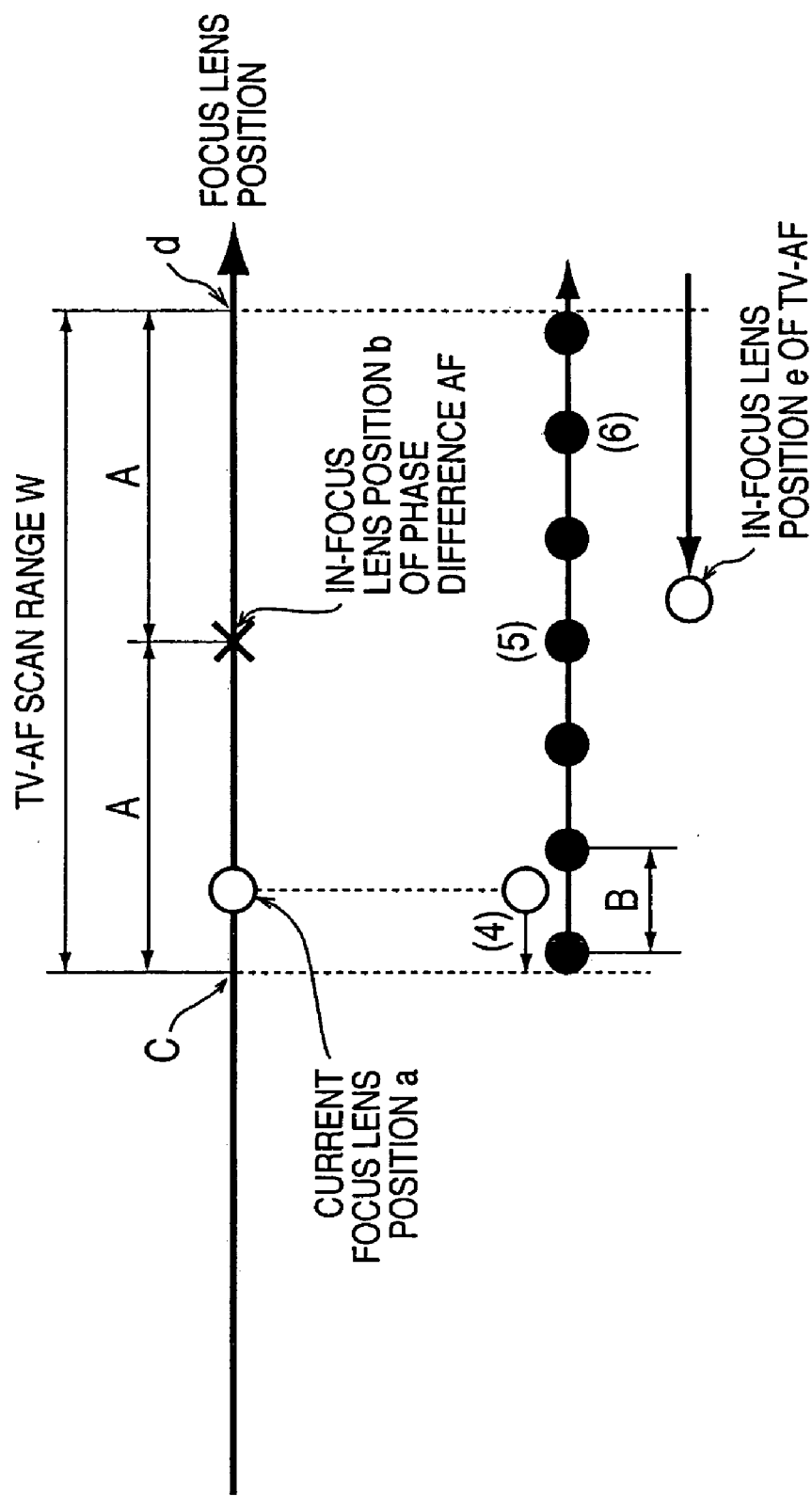
FIG. 10 is a view showing the motion of TV-AF focus driving.

FIG. 10 is a view showing the motion of focus driving in the TV-AF routine of FIG. 6. The lateral direction in FIG. 10 represents the position of the focus lens 2. A position a indicates the position of the focus lens 2 before phase difference AF is performed in step S9 of FIG. 6. At the beginning, the focus lens 2 is located at the position a. In step S9, the process advances to the above-described phase difference AF routine (FIG. 7) to execute the phase difference AF routine in FIG. 7. In step S9, it is detected from the defocus amount by phase difference AF that a position of the focus lens 2 that corresponds to an in-focus point in phase difference AF is a position b. This position of the focus lens 2 is stored in step S11. The stored focus lens position is used to extract an in-focus lens position in phase difference AF in step S16. The position of an end point c can be calculated from the detected position b and the scan range W. That is, the position of the end point c is one returned from the position b by A=W/2. This applies to a case wherein the number of points at which phase difference AF is performed is 1.

Figure 11:
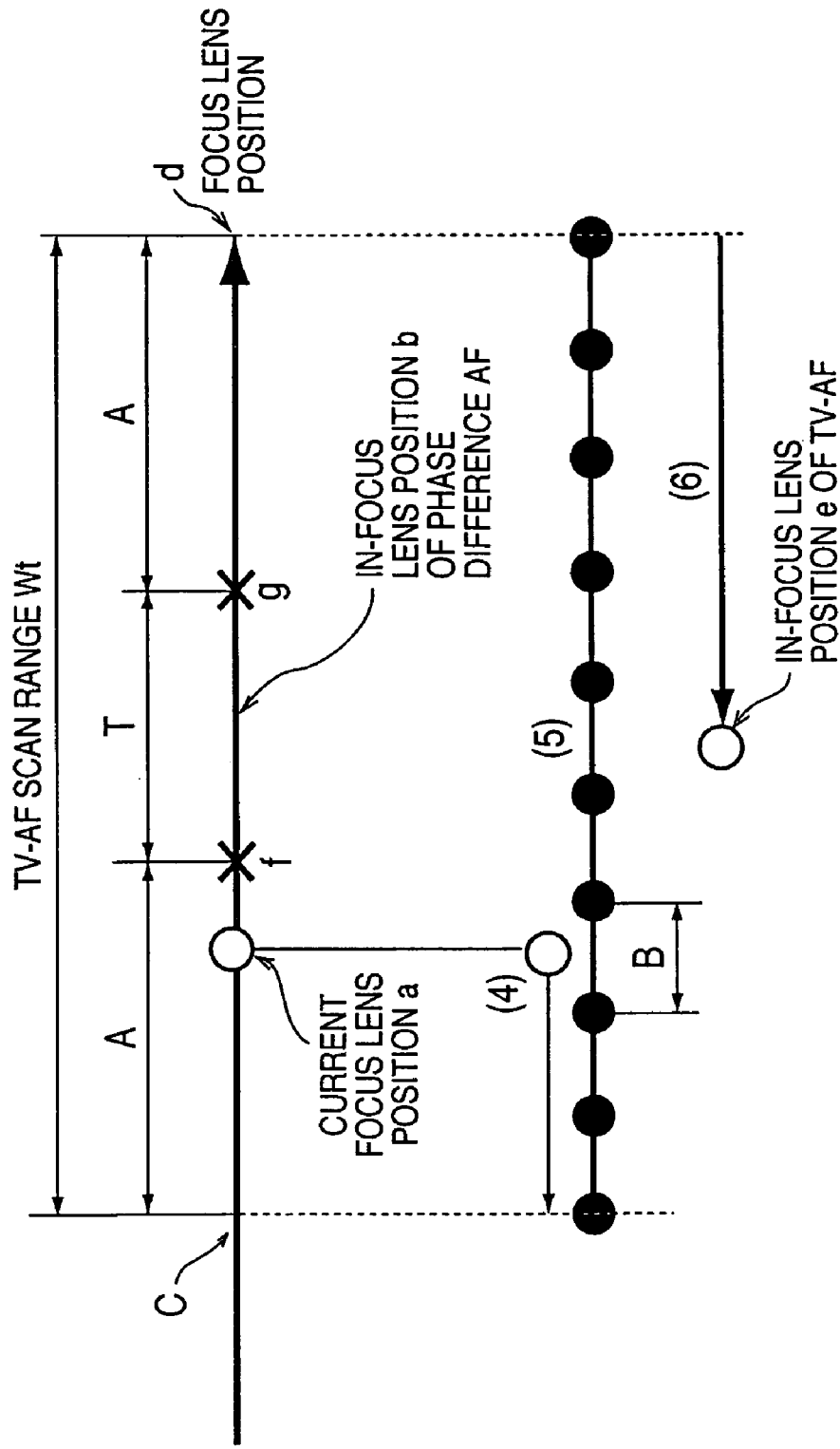
FIG. 11 is a view showing the motion of TV-AF focus driving.

A case wherein a plurality of points are subjected to phase difference AF will be explained with reference to FIG. 11. Assume that, when two points P5 and P8 are subjected to phase difference AF, in-focus lens stop positions corresponding to P5 and P8 in phase difference AF are f and g. T represents an interval between the stop positions f and g. A TV-AF scan range Wt is Wt=2×W/2+T, and the focus lens 2 scans the range Wt. The remaining motion in FIG. 11 is the same as that in FIG. 10.

The focus motor 21 is rotated in the reverse direction to move the focus lens 2 to the position of the end point c of the scan range W (steps S41 to S43). This operation is (4). Then, the focus motor 21 is rotated in the forward direction (step S44) to cause the focus lens 2 to perform operation (5). The image sensing device 8 is exposed at the positions of full circles • during operation (5). The focus lens 2 is moved to repeat steps S45 to S49 by the number of full circles •. This operation is executed within the above-described scan range, and it is determined whether the focus lens 2 falls within the scan range (step S50). The interval between full circles • coincides with the moving interval B in the flowchart of FIG. 8. A high-contrast position is calculated in the scan range by referring to a plurality of exposure data. The focus motor 21 is rotated in the reverse direction (step S51) to perform operation (6). That is, the focus lens 2 is moved to the high-contrast position (step S52). The high-contrast position represents an in-focus point e detected by TV-AF.

As described above, when the position of a main object falls in a range in which phase difference AF is impossible, the lens scan range of contrast AF is determined by referring to immediately preceding distance measurement information of the main object in phase difference AF. The scan range of contrast AF can be narrowed to increase the focusing speed.

Second Embodiment

Only the difference of the second embodiment from the first embodiment will be explained.

Figure 12:
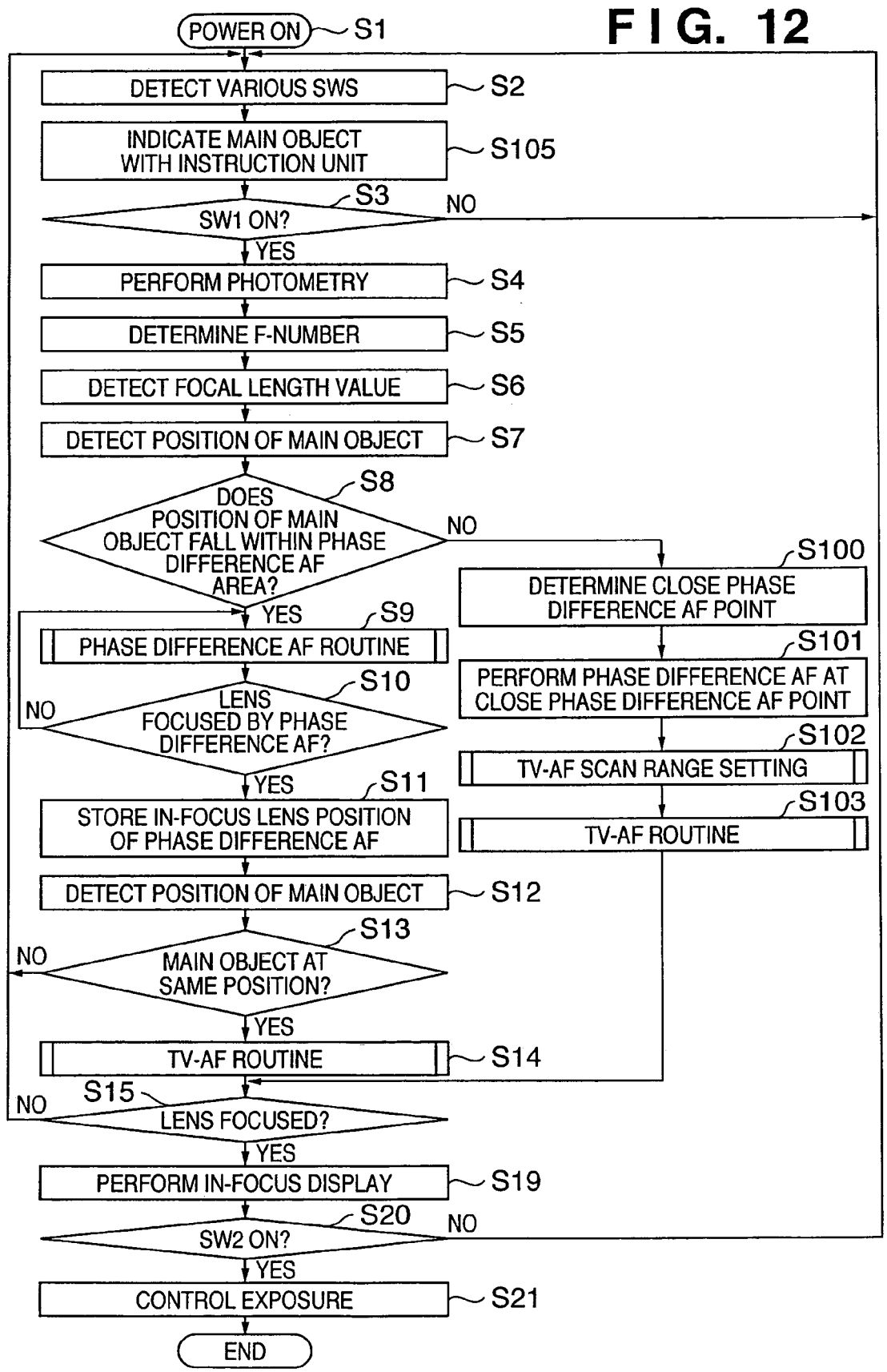
FIG. 12 is a main flowchart showing the operation of an electronic camera according to the second embodiment of the present invention.

In FIG. 12, the same step numerals denote the same operations as those of the first embodiment in FIG. 6, and a description thereof will be omitted.

In FIG. 12, step S105 is added between steps S2 and S3. In step S105, the camera user instructs in advance the camera on the position of a main object. The second embodiment adopts an instruction unit which allows the camera user to instruct in advance the camera on the position of a main object. That is, the camera user indicates an object with an instruction unit 50 while seeing the object on a display 44.

Figure 13:
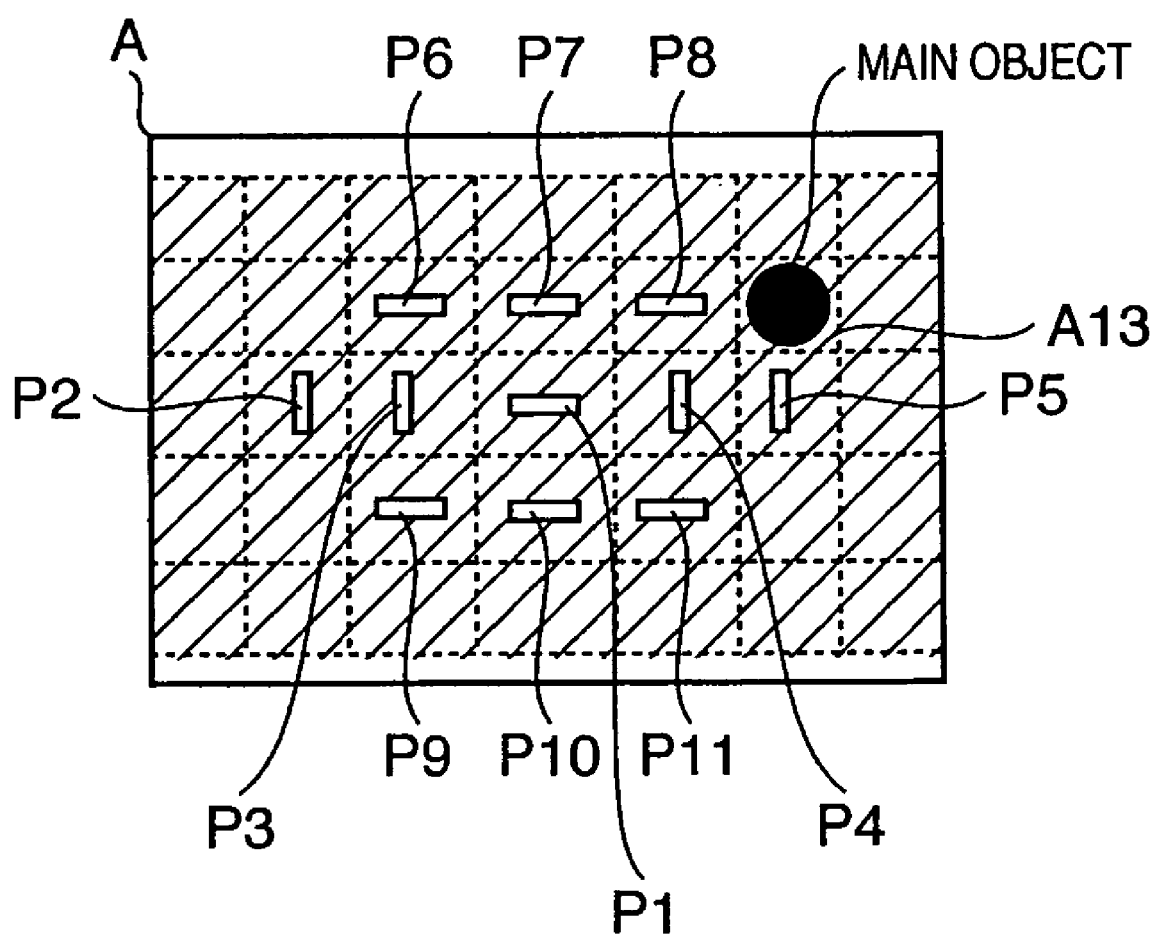
FIG. 13 is a view showing the photographing area and distance measurement area.

Steps S100 to S103 in FIG. 12 will be described. If the position of a main object does not fall within the phase difference AF area in step S8, a distance measurement point to be referred to must be determined, in order to refer to distance measurement information in phase difference AF near the position of the main object. For this purpose, phase difference AF points close to the main object are determined in step S100. Phase difference AF is executed at all the phase difference AF points determined in step S100 (step S101). Note that phase difference AF may be executed at one or a plurality of points. The number of points may be switched in accordance with the position of each main object. FIG. 13 shows the photographing frame and the distance measurement area of each distance measurement device. FIG. 13 is a view showing the photographing area and distance measurement area. For example, when the main object (position of • in FIG. 13) falls within a TV-AF area A13 in FIG. 13, P5 and P8 are selected as phase difference AF points close to the main object, and the TV-AF scan range is set on the basis of distance measurement information of phase difference AF (step S102). The process advances to the TV-AF routine on the basis of the set lens scan range to perform contrast AF (step S103). After that, the process advances to focus determination in step S15 as described in the first embodiment, and subsequent operation of the flowchart is executed.

As described above, when the position of a main object falls within a range in which no phase difference AF can be performed, the lens scan range of contrast AF is determined by referring to distance measurement information of phase difference AF near the main object. The scan range of contrast AF can be narrowed to increase the focusing speed.

The contents of the present invention are not limited to the correspondence between the AF method of calculating a defocus amount from the phase difference of an object image having passed through the photographing lens and detecting an in-focus-state, and the contrast AF method based on an output from the image sensor. The present invention gives attention to the same area and different area of an in-focus detection area from the field of view between two different methods, particularly between phase difference AF (independent of passage through the photographing lens) and contrast AF (independent of an output from the image sensor).

As has been described above, according to the embodiments, a camera comprises an image sensing device, an image sensing optical system which guides a photographing light beam to the image sensing device, a first focus detection device which obtains a defocus amount from a pupil-split image of the first light beam of the photographing light beam and detects the focus on the basis of the defocus amount, a second focus detection device which supplies an output image to the image sensing device with the second light beam of the photographing light beam and detects the focus of the photographing optical system so as to maximize the high-frequency component of the output image, and first and second areas in the photographing field of view. In the first area, the focus can be detected by the first and second focus detection devices. In the second area, the focus can be detected by the second focus detection device. When the focus is detected in the second area, focus detection by the second focus detection device is controlled on the basis of an immediately preceding focus detection result in the first area. Since the immediately preceding focus detection result in the first area is referred to, the focus control range of the second focus detection can be limited to shorten the focusing time.

A camera comprises an image sensing device, an image sensing optical system which guides a photographing light beam to the image sensing device, a first focus detection device which obtains a defocus amount from a pupil-split image of the first light beam of the photographing light beam and detects the focus on the basis of the defocus amount, a second focus detection device which supplies an output image to the image sensing device with the second light beam of the photographing light beam and detects the focus of the photographing optical system so as to maximize the high-frequency component of the output image, and first and second areas in the photographing field of view. In the first area, the focus can be detected by the first and second focus detection devices. In the second area, the focus can be detected by the second focus detection device. When the focus is detected in the second area, focus detection by the second focus detection device is controlled on the basis of focus detection results obtained in one or a plurality of first areas near the second area. Since the focus detection results in one or a plurality of first areas near the second area are referred to, the focus control range of the second focus detection can be limited to shorten the focusing time.

A camera comprises an image sensing device, an image sensing optical system which guides a photographing light beam to the image sensing device, a first focus detection device which obtains a defocus amount from a pupil-split image of the first light beam of the photographing light beam and detects the focus on the basis of the defocus amount, a second focus detection device which supplies an output image to the image sensing device with the second light beam of the photographing light beam and detects the focus of the photographing optical system so as to maximize the high-frequency component of the output image, a main object detection device which detects the position of a main object in the photographing field of view, and first and second areas in the photographing field of view. In the first area, the focus can be detected by the first and second focus detection devices. In the second area, the focus can be detected by the second focus detection device. When the main object is located in the first area, the focus is detected by the first focus detection device. After the main object moves to the second area, focus detection by the second focus detection device is controlled on the basis of the focus detection result obtained by the first focus detection device. Since the immediately preceding focus detection result in the first area is referred to, the focus control range of the second focus detection can be limited to shorten the focusing time.

A camera comprises an image sensing device, an image sensing optical system which guides a photographing light beam to the image sensing device, a first focus detection device which obtains a defocus amount from a pupil-split image of the first light beam of the photographing light beam and detects the focus on the basis of the defocus amount, a second focus detection device which supplies an output image to the image sensing device with the second light beam of the photographing light beam and detects the focus of the photographing optical system so as to maximize the high-frequency component of the output image, a main object detection device which detects the position of a main object in the photographing field of view, and first and second areas in the photographing field of view. In the first area, the focus can be detected by the first and second focus detection devices. In the second area, the focus can be detected by the second focus detection device. When the main object is located in the second area, focus detection by the second focus detection device is controlled on the basis of focus detection results by the first focus detection device in one or a plurality of first areas near the second area. Since the focus detection results in one or a plurality of first areas near the second area are referred to, the focus control range of the second focus detection can be limited to shorten the focusing time.

A camera comprises an image sensing device, an image sensing optical system which guides a photographing light beam to the image sensing device, a first focus detection device which obtains a defocus amount from a pupil-split image of the first light beam of the photographing light beam and detects the focus on the basis of the defocus amount, a second focus detection device which supplies an output image to the image sensing device with the second light beam of the photographing light beam and detects the focus of the photographing optical system so as to maximize the high-frequency component of the output image, a main object detection device which detects the position of a main object in the photographing field of view, and first and second areas in the photographing field of view. In the first area, the focus can be detected by the first and second focus detection devices. In the second area, the focus can be detected by the second focus detection device. The camera further comprises an instruction device which indicates a main object in the photographing field of view. When the main object indicated by the instruction device is located in the second area, focus detection by the second focus detection device is controlled on the basis of a focus detection result by the first focus detection device in the first area near the second area. Since the focus control range of the second focus detection can be limited in the indicated area, the focusing time can be shortened.

According to the present invention, the focusing speed can be increased to quickly focus the camera to an object regardless of the position of the object within the field of the viewfinder.

Other Embodiment

The object of the embodiments can also be achieved by supplying a storage medium (or recording medium) which stores software program codes for implementing the functions of the above-described embodiments to a system or apparatus and causing the computer (or CPU or MPU) of the system or apparatus to read out and execute the program codes stored in the storage medium. In this case, the program codes read out from the storage medium implement the functions of the above-described embodiments by themselves, and the storage medium which stores the program codes constitutes the present invention. The functions of the above-described embodiments are implemented not only when the readout program codes are executed by the computer but also when the OS (Operating System) running on the computer performs some or all of actual processes on the basis of the instructions of the program codes.

The functions of the above-described embodiments are also implemented when the program codes read out from the storage medium are written in the memory of a function expansion card inserted into the computer or a function expansion unit connected to the computer, and the CPU of the function expansion card or function expansion unit performs some or all of actual processes on the basis of the instructions of the program codes.

When the present invention is applied to the storage medium, the storage medium stores program codes corresponding to the above-described procedures.

As many apparently widely different embodiments of the present invention can be made without departing from the spirit and scope thereof, it is to be understood that the invention is not limited to the specific embodiments thereof except as defined in the appended claims.

This application claims the benefit of Japanese Application No. 2005-017191, filed on Jan. 25, 2005 which is hereby incorporated by reference herein in its entirety.

What is claimed is:

1. A camera comprising:
 a first focus detection device which is capable of obtaining a defocus amount from a phase difference of a main object and detecting a focus on a basis of the defocus amount in a plurality of defocus amount detection areas;
 a second focus detection device which detects a focus in accordance with contrast signal of image signal that is obtained from an image sensor while a focus lens is moving;
 a first area in a photographing field of view where the focus can be detected by both said first focus detection device and said second focus detection device;
 a second area in the photographing field of view where the focus can be detected by said second focus detection device and cannot be detected by said first focus detection device; and
 a determining device which determines whether the main object to be focused exists in the second area,
 wherein said second focus detection device detects a focus while the focus lens is moving in accordance with detection result of the first focus detection device, and
 wherein a selection method for selecting a defocus amount detection area from the plurality of defocus amount detection areas is changed in accordance with whether the main object to be focused exists in the second area or not.

2. The camera according to claim 1, wherein when the main object to be focused exists in the first area, focus detection by said second focus detection device is controlled on a basis of a detection result by said first focus detection device that corresponds to the first area where the main object exists.

3. The camera according to claim 1, wherein when the main object to be focused exists in the second area, focus detection by said second focus detection device is controlled on a basis of a detection result by said first focus detection device that corresponds to the first area near the second area where the main object exists.

4. The camera according to claim 1, wherein when the main object to be focused moves from the first area to the second area, focus detection by said second focus detection device is controlled on a basis of a detection result by said first focus detection device that corresponds to the first area where the main object exists.

5. The camera according to claim 1, further comprising an object position detection device which detects a position of the main object to be focused.

6. The camera according to claim 1, further comprising an object position instruction device which indicates a position of the main object to be focused.

7. A method of controlling a camera having a first focus detection device which is capable of obtaining a defocus amount from a phase difference of a main object and detecting a focus on a basis of the defocus amount in a plurality of defocus amount detection areas, a second focus detection device which detects a focus in accordance with contrast signal of image signal that is obtained from an image sensor while a focus lens is moving, a first area in a photographing field of view where the focus can be detected by both the first focus detection device and the second focus detection device, and a second area in the photographing field of view where the focus can be detected by the second focus detection device and cannot be detected by the first focus detection device, wherein said second focus detection device detects a focus while the focus lens is moving in accordance with detection result of the first focus detection device, the method comprising:

determining whether the main object to be focused exists in the second area; and changing a selection method for selecting a defocus amount detection area from the plurality of defocus amount detection areas in accordance with whether the main object to be focused exists in the second area or not.

8. A computer-readable medium embodying a computer program that causes a computer to execute the method defined in claim 7.

* * * * *